United States Patent
Yang et al.

(10) Patent No.: US 11,909,490 B2
(45) Date of Patent: Feb. 20, 2024

(54) SCHEDULING REQUEST TRANSMITTING METHOD, SCHEDULING REQUEST RECEIVING METHOD, TERMINAL, AND NETWORK DEVICE

(71) Applicant: VIVO MOBILE COMMUNICATION CO., LTD., Chang'an Dongguan (CN)

(72) Inventors: Yu Yang, Chang'an Dongguan (CN); Yumin Wu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 89 days.

(21) Appl. No.: 17/571,865

(22) Filed: Jan. 10, 2022

(65) Prior Publication Data
US 2022/0131593 A1   Apr. 28, 2022

Related U.S. Application Data

(63) Continuation of application No. PCT/CN2020/101292, filed on Jul. 10, 2020.

(30) Foreign Application Priority Data

Jul. 11, 2019   (CN) .......................... 201910626768.2

(51) Int. Cl.
*H04B 7/06* (2006.01)
*H04W 72/044* (2023.01)
(Continued)

(52) U.S. Cl.
CPC ........ *H04B 7/0695* (2013.01); *H04W 72/044* (2013.01); *H04W 72/1263* (2013.01); *H04W 76/19* (2018.02); *H04W 80/02* (2013.01)

(58) Field of Classification Search
CPC ...... H04B 7/0695; H04B 7/024; H04B 7/061; H04W 72/044; H04W 72/1263;
(Continued)

(56) References Cited

U.S. PATENT DOCUMENTS

2011/0255492 A1   10/2011   Dai
2012/0302274 A1   11/2012   Ohta et al.
(Continued)

FOREIGN PATENT DOCUMENTS

CN   101778418 A   7/2010
CN   108882327 A   11/2018
(Continued)

OTHER PUBLICATIONS

Japanese Notice of Reasons for Refusal for related Application No. 2022-501344; dated Dec. 13, 2022.
(Continued)

*Primary Examiner* — Harry H Kim
(74) *Attorney, Agent, or Firm* — von Briesen & Roper, s.c.

(57) ABSTRACT

Embodiments of this disclosure provide a scheduling request transmitting method, a scheduling request receiving method, a terminal, and a network device. The scheduling request transmitting method includes: in a case that a first trigger condition is met, transmit a scheduling request SR to a network device; and in a case that a second trigger condition is met, cancel transmission of the SR, or skip transmission of the SR for N times, where N is an integer greater than 1.

15 Claims, 4 Drawing Sheets

In a case that a first trigger condition is met, send a scheduling request SR to a network device — 201

In a case that a second trigger condition is met, cancel transmission of the SR, or skip transmission of the SR for N times — 202

(51) Int. Cl.
  *H04W 72/1263* (2023.01)
  *H04W 76/19* (2018.01)
  *H04W 80/02* (2009.01)
  *H04W 72/21* (2023.01)
  *H04W 16/28* (2009.01)
  *H04B 7/024* (2017.01)

(58) Field of Classification Search
  CPC ..... H04W 76/19; H04W 80/02; H04W 72/21; H04W 16/28; H04W 72/23
  See application file for complete search history.

(56) References Cited

U.S. PATENT DOCUMENTS

| | | | |
|---|---|---|---|
| 2018/0368124 A1 | 12/2018 | Liu | |
| 2019/0166539 A1 | 5/2019 | Chen | |
| 2019/0394082 A1* | 12/2019 | Cirik | H04W 24/08 |
| 2021/0058957 A1* | 2/2021 | Zhao | H04W 72/535 |
| 2021/0307038 A1 | 9/2021 | Liu | |
| 2021/0360610 A1* | 11/2021 | Kim | H04L 5/0094 |
| 2022/0045834 A1* | 2/2022 | Jung | H04W 80/02 |
| 2022/0123823 A1* | 4/2022 | Dong | H04B 7/0695 |
| 2022/0167197 A1* | 5/2022 | Li | H04B 7/0404 |
| 2022/0352959 A1* | 11/2022 | Uchino | H04W 76/15 |

FOREIGN PATENT DOCUMENTS

| | | |
|---|---|---|
| CN | 109156027 A | 1/2019 |
| CN | 109842894 A | 6/2019 |
| WO | 2011099150 A1 | 8/2011 |
| WO | 2018093169 A1 | 5/2018 |
| WO | 2019032882 A1 | 2/2019 |

OTHER PUBLICATIONS

NTT Docomo, Inc., "Discussion on multi-beam enhancement", May 13-17, 2019, 3GPP TSG RAN WG1 #97, Reno, USA, R1-1906225.

R1-1906537, Source: MediaTek Inc., "Enhancements on multi-beam operations" Document for: Discussion, Agenda Item: 7.2.8.3, 3GPP TSG RAN WG1 #97, Reno, USA, May 13-17, 2019.

R1-1907466, Source: Convida Wireless, "On Beam Failure Recovery for SCell" Document for: Discussion, Agenda Item: 7.2.8.3, 3GPP TSG-RAN WG1 #97, Reno, USA, May 13-17, 2019.

R2-1811001, Source: ETSI MCC, "Report of 3GPP TSG RAN2#102 meeting, Busan, Korea" Document for: Approval, Agenda item: 2.2, 3GPP TSG-RAN WG2 meeting #103, Gothenburg, Sweden, Aug. 20-24, 2018.

First Chinese Office Action related to Application No. 201910626768.2 dated Feb. 7, 2022.

Second Chinese Office Action related to Application No. 201910626768.2 dated Jul. 7, 2022.

International Search Report and Written Opinion related to Application No. PCT/CN2020/101292 dated Jan. 20, 2022.

Extended European Search Report related to Application No. 20836701.1 dated Jun. 30, 2022.

Indian Office Action related to Application No. 202227007110 dated Jul. 15, 2022.

R1-1907533, Source: Huawei, HiSilicon, "Beam failure recovery for SCell with new beam information" Document for: Discussion and Decision, Agenda Item: 7.2.8.5, Release: 3GPP TSG RAN WG1 Meeting #97, May 13-17, 2019, Reno, USA.

* cited by examiner

US 11,909,490 B2

SCHEDULING REQUEST TRANSMITTING METHOD, SCHEDULING REQUEST RECEIVING METHOD, TERMINAL, AND NETWORK DEVICE

CROSS-REFERENCE TO RELATED APPLICATIONS

The present application is a continuation application of International Application No. PCT/CN2020/101292 filed on Jul. 10, 2020, which claims priority to Chinese Patent Application No. 201910626768.2, filed in China on Jul. 11, 2019, which are incorporated herein by reference in their entirety.

TECHNICAL FIELD

This disclosure relates to the field of communications technologies, and in particular, to a scheduling request transmitting method, a scheduling request receiving method, a terminal, and a network device.

BACKGROUND

In a high band communications system, because of a short wavelength of radio signals, signal propagation is likely to be blocked, resulting in interruption of signal propagation. Radio link reestablishment in the related art is time-consuming. Therefore, a beam failure recovery mechanism is introduced. The beam failure recovery (BFR) mechanism in the related art includes the following four steps:
1. Beam failure detection. A terminal performs measurement on a beam failure detection reference signal at a physical layer, and determines, based on a measurement result, whether a beam failure event has occurred.
2. New candidate beam identification. The terminal performs measurement on a beam identification reference signal at the physical layer to find a new candidate beam. This step is not necessarily performed after a beam failure event, but may be performed before a beam failure event.
3. Beam failure recovery request (BFRQ) information transmission.
4. The terminal monitors a beam failure recovery request response of a network device (UE monitors gNB response for beam failure recovery request).

In a secondary cell beam failure recovery (SCell BFR) procedure, a scheduling request (SR) can be used to trigger the network device to configure or indicate an uplink grant resource to the terminal, so that the BFRQ information is transmitted on the uplink grant resource. However, in the related art, after an SR trigger condition is met, the terminal will periodically transmit an SR, leading to high resource overheads for the SR.

SUMMARY

According to a first aspect, an embodiment of this disclosure provides a scheduling request transmitting method, applied to a terminal and including:
in a case that a first trigger condition is met, transmitting a scheduling request SR to a network device; and
in a case that a second trigger condition is met, canceling transmission of the SR, or skipping transmission of the SR for N times, where N is an integer greater than 1.

According to a second aspect, an embodiment of this disclosure further provides a scheduling request receiving method, applied to a network device and including:
receiving a scheduling request SR transmitted by a terminal in a case that a first trigger condition is met; and
in a case that a second trigger condition is met, stopping reception of the SR, or skipping reception of the SR for N times, where N is an integer greater than 1.

According to a third aspect, an embodiment of this disclosure further provides a terminal, including:
a transmitting module, configured to: in a case that a first trigger condition is met, transmit a scheduling request SR to a network device; and in a case that a second trigger condition is met, cancel transmission of the SR, or skip transmission of the SR for N times, where N is an integer greater than 1.

According to a fourth aspect, an embodiment of this disclosure further provides a network device, including:
a receiving module, configured to receive a scheduling request SR transmitted by a terminal in a case that a first trigger condition is met; and in a case that a second trigger condition is met, stop reception of the SR, or skip reception of the SR for N times, where N is an integer greater than 1.

According to a fifth aspect, an embodiment of this disclosure further provides a terminal, including a memory, a processor, and a program stored in the memory and capable of running on the processor, where when the program is executed by the processor, the steps of the foregoing scheduling request transmitting method are implemented.

According to a sixth aspect, an embodiment of this disclosure further provides a network device, including a memory, a processor, and a program stored in the memory and capable of running on the processor, where when the program is executed by the processor, the steps of the foregoing scheduling request receiving method are implemented.

According to a seventh aspect, an embodiment of this disclosure further provides a computer-readable storage medium, where a computer program is stored in the computer-readable storage medium. When the computer program is executed by a processor, the steps of the foregoing scheduling request transmitting method are implemented, or when the computer program is executed by a processor, the steps of the foregoing scheduling request receiving method are implemented.

DETAILED DESCRIPTION OF THE EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent an example, an instance, or an illustration. Any embodiment or design solution described as "an example" or "for example" in the embodiments of this disclosure shall not be interpreted as being more preferred or advantageous than other embodiments or design solutions. Specifically, the terms such as "an example" or "for example" are intended to present related concepts in a specific manner.

The following describes the embodiments of this disclosure with reference to the accompanying drawings. A scheduling request transmitting method, a scheduling request receiving method, a terminal, and a network device provided in the embodiments of this disclosure may be applied to a wireless communications system. The wireless communications system may be a fifth generation (5G) system, or an evolved long term evolution (eLTE) system, or a later evolved communications system.

Figure 1:
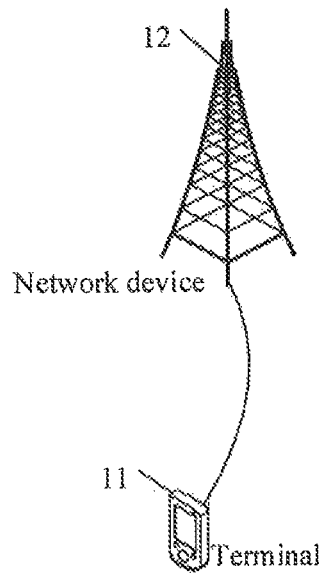
FIG. 1 is a structural diagram of a network system to which an embodiment of this disclosure may be applied.

Referring to FIG. 1, FIG. 1 is a structural diagram of a network system to which an embodiment of this disclosure may be applied. As shown in FIG. 1, the network system includes a terminal 11 and a network device 12. The terminal 11 may be user equipment or other terminal-side devices such as a mobile phone, a tablet personal computer, a laptop computer, a personal digital assistant (PDA), a mobile Internet device (MID), or a wearable device. It should be noted that a specific type of the terminal 11 is not limited in the embodiments of this disclosure. The network device 12 may be a 5G base station, a base station of a later version, or a base station in other communications systems, or may be referred to as a NodeB, an evolved NodeB, a transmission reception point (TRP), an access point (AP), or other terms in the field. Provided that a same technical effect is achieved, the network device is not limited to a specific technical term. In addition, the network device 12 may be a master node (MN) or a secondary node (SN). It should be noted that, in some embodiments of this disclosure, the 5G base station is used as only an example, but the network device is not limited to any specific type.

Figure 2:
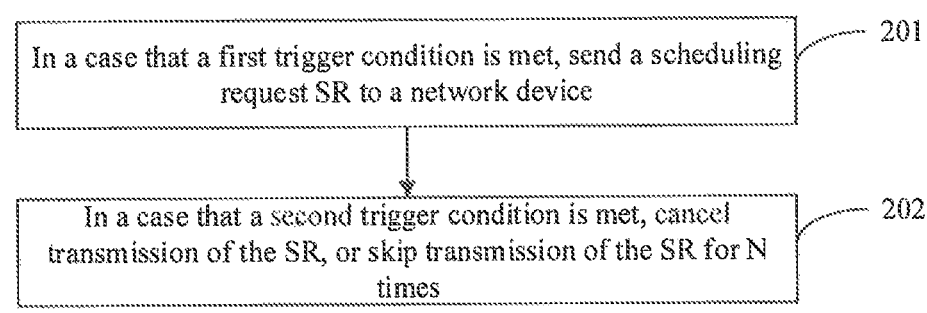
FIG. 2 is a flowchart of a scheduling request transmitting method according to an embodiment of this disclosure.

Referring to FIG. 2, FIG. 2 is a flowchart of a scheduling request transmitting method according to an embodiment of this disclosure. The method is applied to a terminal and includes the following steps, as shown in FIG. 2.

Step 201. In a case that a first trigger condition is met, transmit a scheduling request SR to a network device.

Step 202. In a case that a second trigger condition is met, cancel transmission of the SR, or skip transmission of the SR for N times, where N is an integer greater than 1.

The SR may be used to trigger the network device to configure or indicate an uplink grant resource, where BFRQ information can be transmitted on the uplink grant resource. A value of N may be set according to actual needs. In this embodiment, the value of N may be prescribed by a protocol or notified by the network device.

In the embodiments of this disclosure, an SR and BFRQ information may be triggered at transmission of a beam failure event, and transmission of the SR is restricted by the preset second trigger condition. For example, when the second trigger condition is met, transmission of the SR may be canceled, or transmission of the SR may be directly skipped for N times, where the value of N may be set according to actual needs. No further limitation is imposed herein.

Optionally, the SR is in a pending state after being generated. The terminal may transmit the SR in the pending state.

In this embodiment of this disclosure, the second trigger condition is set, and in a case that the second trigger condition is met, transmission of the SR is canceled, or transmission of the SR is skipped for N times. This reduces transmissions of the SR, thereby reducing resource overheads for the SR; and also reduces power consumption of the terminal, thereby extending standby time of the terminal.

Optionally, the SR may be an SR dedicated to beam failure recovery (hereinafter referred to as a dedicated SR), or another SR (hereinafter referred to as a related art SR). The dedicated SR is used to notify the network device that BFRQ information is to be sent to the network device, that is, the dedicated SR is used to trigger a first uplink grant resource indicated by the network device, where the first uplink grant resource is dedicated to transmission of the BFRQ information. The related art SR may be used to notify the network device that other pending uplink information exists. The network device may configure or indicate a second uplink grant resource to the terminal based on the related art SR. The BFRQ information may be transmitted on the second uplink grant resource with other uplink information.

Optionally, in an embodiment, after step 201, the method further includes:
transmitting, on an uplink grant resource configured or indicated by the network device, BFRQ information to the network device.

In this embodiment, the uplink grant resource configured or indicated by the network device may include the foregoing first uplink grant resource or a latest available second uplink grant resource. Optionally, the second uplink grant resource includes at least one of the following:
an uplink grant resource of a configured grant;
an uplink grant resource of a dynamic grant; and
an uplink grant resource in a random access (RA) procedure.

Optionally, the random access procedure may specifically be a 2-step random access procedure or a 4-step random access procedure. Correspondingly, the second uplink grant resource refers to a PUSCH of the 2-step random access (2-step RA) procedure or a PUSCH of the 4-step random access (4-step RA) procedure.

Further, the BFRQ information may be carried by a medium access control control element (MAC CE).

In this embodiment, different pieces of BFRQ information may be transmitted on different MAC CEs, where one MAC CE is used to transmit part or all of one piece of BFRQ information; or multiple or all pieces of BFRQ information are transmitted on one MAC CE.

Further, in an optional embodiment, when the second trigger condition is met, the method further includes:

canceling transmission of the BFRQ information.

In this embodiment of this disclosure, the second trigger condition is set as a trigger condition for canceling transmission of the BFRQ information, so that repeated transmission of the BFRQ information can be reduced. In this way, an amount of data sent can be further reduced, thereby reducing resource overheads, reducing the power consumption of the terminal, and extending the standby time of the terminal.

It should be understood that the first trigger condition may be specifically set according to actual needs. For example, in an optional embodiment, the first trigger condition may include at least one of the following:

a beam failure is detected;

a beam failure is detected and a new beam is identified; and pending beam failure recovery request BFRQ information exists, but no uplink resource is available for transmitting the pending BFRQ information.

That a beam failure is detected includes at least one of the following:

a beam failure is detected in a cell;

a beam failure is detected in a bandwidth part (BWP);

a beam failure is detected at a transmission reception point TRP.

That a beam failure is detected and a new beam is identified includes at least one of the following:

a beam failure is detected in a cell, and a new beam is identified in the cell in which the beam failure is detected;

a beam failure is detected in a bandwidth part BWP, and a new beam is identified in the BWP in which the beam failure is detected; and a beam failure is detected at a transmission reception point TRP, and a new beam is identified at the TRP at which the beam failure is detected.

In this embodiment, the terminal may measure a beam failure detection reference signal (BFD RS), and determines, based on a measurement result, whether a beam failure event has occurred in at least one target object, where the target object is a cell, a BWP, or a TRP. In addition, the terminal may determine, by measuring a downlink reference signal used for identifying a new candidate beam, whether a new beam is found in the cell, BWP or TRP in which the beam failure occurs.

In this embodiment, that pending BFRQ information exists, but no uplink resource is available for transmitting the pending BFRQ information may be specifically understood as: in a case that a MAC CE for transmitting BFRQ information (MAC CE for BFRQ) exists, there is no physical uplink shared channel (PUSCH) resource for new transmission, or even if an uplink resource exists, but according to a logical channel priority relationship, the MAC CE for BFRQ has a low priority and cannot use the uplink resource.

Further, the transmitting a scheduling request SR to a network device, the method further includes:

in a case that a beam failure occurs, triggering a first MAC CE, where the first MAC CE is used to transmit BFRQ information; or in a case that a beam failure is detected and a new beam is identified, triggering a first MAC CE, where the first MAC CE is used to transmit BFRQ information.

In the embodiments of this disclosure, different first MAC CEs (MAC CEs for BFRQ) may correspond to different SRs. For example, MAC CEs for BFRQ of different secondary cells SCells correspond to different SRs.

Optionally, after the first MAC CE is generated, the first MAC CE is in a pending state. The terminal may transmit the first MAC CE in the pending state.

It should be understood that in this embodiment, after generation of the first MAC CE is triggered, it may be understood as that pending BFRQ information exists.

Further, specific content of the second trigger condition may be set according to actual needs. In an optional embodiment, the second trigger condition includes any one of the following:

BFRQ information is sent to the network device;

beam failure recovery is completed;

at least one of radio resource control (RRC), a medium access control control element MAC CE, and downlink control information (DCI) is received from the network device;

a cell in which a beam failure has occurred is released or deactivated;

a bandwidth part BWP in which a beam failure has occurred is released or deactivated;

a transmission reception point TRP in which a beam failure has occurred is released or deactivated;

switching to a new cell is performed;

switching to a new bandwidth part BWP is performed;

switching to a new transmission reception point TRP is performed; and switching to a new beam is performed.

In this embodiment of this disclosure, that at least one of RRC, MAC CE, and DCI is received from the network device may be understood as that the network device transmits scheduling signaling, beam training related signaling, release or deactivation signaling, handover signaling, or the like to the terminal by using at least one of RRC signaling, a MAC CE command, and DCI signaling. Specifically, the RRC signaling, the MAC CE command, and the DCI signaling may be transmitted on a target object on which the beam failure occurs, or may be transmitted on a target object on which no beam failure occurs.

For better understanding of this disclosure, a specific implementation process of this disclosure is described in detail by using an example in which a target object associated with the BFRQ information is a cell and the BFRQ information is carried by a MAC CE. Specifically, the following steps may be included.

Step 1. The terminal measures a BFD RS, and determines, based on a measurement result, whether a beam failure event has occurred in at least one target object.

Step 2. The terminal measures a downlink reference signal used for identifying a new candidate beam (DL RS for new beam identification), and determines whether a new beam is found. There is no specific sequence between step 2 and step 1.

Step 3. The terminal triggers generation of a MAC CE used for transmitting BFRQ information (that is, MAC CE for BFRQ).

The MAC CE used for transmitting BFRQ information may be a MAC CE dedicated to BFRQ transmission (the MAC CE is different from the related art MAC CE), for example, using a new logical channel header identifier. The MAC CE used for transmitting BFRQ information may alternatively be a MAC CE used for transmitting other uplink information. A newly defined value of a reserved bit in the MAC CE is used to identify whether the MAC CE is used to transmit BFRQ information.

Further, in a case that a beam failure is detected in the target object, generation of a MAC CE for BFRQ is also triggered, and the MAC CE for BFRQ is also in the pending state; or in a case that a beam failure is detected in the target object and a new beam is identified in the target object, generation of a MAC CE for BFRQ is also triggered, and the MAC CE for BFRQ is also in the pending state.

Step 4. If a first trigger condition is met, the terminal transmits an SR to a network device.

The SR may be a related art SR; or the SR is an SR dedicated to beam failure recovery, such as a dedicated SR. The dedicated SR is used to notify the network device that BFRQ information is to be sent to the network device, that is, the dedicated SR is used to trigger an uplink resource (PUSCH) used for transmitting a MAC CE for BFRQ.

Optionally, the SR is in the pending state.

Optionally, the SR is periodically and continuously sent to the network by the terminal.

Step 5. The terminal transmits a MAC CE for BFRQ to the network device.

Optionally, the MAC CE for BFRQ may be sent on the uplink resource triggered by the dedicated SR, meaning that the network device indicates the uplink resource through DCI after receiving the dedicated SR.

Optionally, the MAC CE for BFRQ may be sent on a latest available uplink resource, such as an uplink resource corresponding to a latest available configured grant, a dynamic grant, or an RA procedure.

Further, the RA procedure may be a 2-step RA procedure or a 4-step RA procedure. Correspondingly, the latest available uplink resource refers to a PUSCH of the 2-step random access (2-step RA) procedure or a PUSCH of the 4-step random access (4-step RA) procedure.

Step 6. In a case that a second trigger condition is met, cancel transmission of the SR, or skip transmission of the SR for N times.

Optionally, the second trigger condition includes any one of the following:
BFRQ information is sent to the network device;
beam failure recovery is completed;
at least one of radio resource control RRC, a medium access control control element MAC CE, and downlink control information DCI is received from the network device;
a cell in which a beam failure has occurred is released or deactivated;
a bandwidth part BWP in which a beam failure has occurred is released or deactivated;
a transmission reception point TRP in which a beam failure has occurred is released or deactivated;
switching to a new cell is performed;
switching to a new bandwidth part BWP is performed;
switching to a new transmission reception point TRP is performed; and
switching to a new beam is performed.

It should be understood that when the first trigger condition is met again, an SR is sent again.

Further, in a case that the foregoing second trigger condition is met, the terminal may also cancel transmission of the MAC CE for BFRQ.

Figure 3:
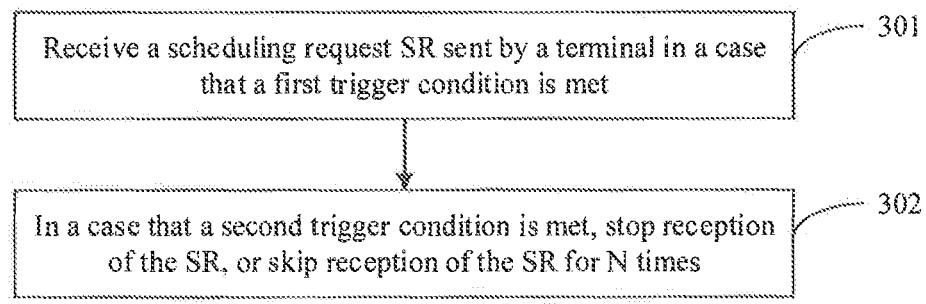
FIG. 3 is a flowchart of a scheduling request receiving method according to an embodiment of this disclosure.

Referring to FIG. 3, FIG. 3 is a flowchart of a scheduling request receiving method according to an embodiment of this disclosure. The method is applied to a network device, and includes the following steps, as shown in FIG. 3.

Step 301. Receive a scheduling request SR transmitted by a terminal in a case that a first trigger condition is met.

Step 302. In a case that a second trigger condition is met, stop reception of the SR, or skip reception of the SR for N times, where N is an integer greater than 1.

Optionally, the first trigger condition includes at least one of the following:
the terminal detects a beam failure;
the terminal detects a beam failure and identifies a new beam; and
the terminal has pending beam failure recovery request BFRQ information, but no uplink resource is available for transmitting the pending BFRQ information.

Optionally, that the terminal detects a beam failure includes at least one of the following:
the terminal detects a beam failure in a cell;
the terminal detects a beam failure in a bandwidth part BWP; and
the terminal detects a beam failure at a transmission reception point TRP.

That the terminal detects a beam failure and identifies a new beam includes at least one of the following:
the terminal detects a beam failure in a cell, and identifies a new beam in the cell in which the beam failure is detected;
the terminal detects a beam failure in a bandwidth part BWP, and identifies a new beam in the BWP in which the beam failure is detected; and
the terminal detects a beam failure at a transmission reception point TRP, and identifies a new beam at the TRP at which the beam failure is detected.

Optionally, the second trigger condition includes any one of the following:
BFRQ information sent by the terminal is received;
beam failure recovery is completed;
at least one of radio resource control RRC, a medium access control control element MAC CE, and downlink control information DCI is sent to the terminal;
a cell in which a beam failure has occurred is released or deactivated;
a bandwidth part BWP in which a beam failure has occurred is released or deactivated;
a transmission reception point TRP in which a beam failure has occurred is released or deactivated;
switching to a new cell is performed;
switching to a new bandwidth part BWP is performed;
switching to a new transmission reception point TRP is performed; and
switching to a new beam is performed.

Optionally, after the receiving a scheduling request SR transmitted by a terminal in a case that a first trigger condition is met, the method further includes:
receiving, on an uplink grant resource configured or indicated by the network device, BFRQ information sent by the terminal.

Optionally, the BFRQ information is carried by a MAC CE.

Optionally, in a case that the second trigger condition is met, reception of the BFRQ information is stopped.

Optionally, the SR is an SR dedicated to beam failure recovery.

It should be noted that this embodiment is used as an implementation of the network device corresponding to the embodiment shown in FIG. 2. For specific implementations of this embodiment, reference may be made to the relevant descriptions about the embodiment shown in FIG. 2, and the same beneficial effect is achieved. To avoid repetition, details are not described herein again.

Figure 4:
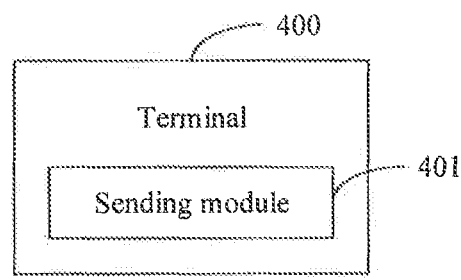
FIG. 4 is a structural diagram of a terminal according to an embodiment of this disclosure.

Referring to FIG. 4, FIG. 4 is a structural diagram of a terminal according to an embodiment of this disclosure. As shown in FIG. 4, the terminal 400 includes:

a transmitting module 401, configured to: in a case that a first trigger condition is met, transmit a scheduling request SR to a network device; and in a case that a second trigger condition is met, cancel transmission of the SR, or skip transmission of the SR for N times, where N is an integer greater than 1.

Optionally, the first trigger condition includes at least one of the following:
  a beam failure is detected;
  a beam failure is detected and a new beam is identified; and
  pending beam failure recovery request BFRQ information exists, but no uplink resource is available for transmitting the pending BFRQ information.

Optionally, the terminal 400 further includes:
  a first trigger module, configured to: in a case that a beam failure occurs, trigger a first MAC CE, where the first MAC CE is used to transmit BFRQ information;
  or in a case that a beam failure is detected and a new beam is identified, trigger a first MAC CE, where the first MAC CE is used to transmit BFRQ information.

Optionally, that a beam failure is detected includes at least one of the following:
  a beam failure is detected in a cell;
  a beam failure is detected in a bandwidth part BWP; and
  a beam failure is detected at a transmission reception point TRP.

That a beam failure is detected and a new beam is identified includes at least one of the following:
  a beam failure is detected in a cell, and a new beam is identified in the cell in which the beam failure is detected;
  a beam failure is detected in a bandwidth part BWP, and a new beam is identified in the BWP in which the beam failure is detected; and
  a beam failure is detected at a transmission reception point TRP, and a new beam is identified at the TRP at which the beam failure is detected.

Optionally, the first MAC CE is in a pending state.

Optionally, the second trigger condition includes any one of the following:
  BFRQ information is sent to the network device;
  beam failure recovery is completed;
  at least one of radio resource control RRC, a medium access control control element MAC CE, and downlink control information DCI is received from the network device;
  a cell in which a beam failure has occurred is released or deactivated;
  a bandwidth part BWP in which a beam failure has occurred is released or deactivated;
  a transmission reception point TRP in which a beam failure has occurred is released or deactivated;
  switching to a new cell is performed;
  switching to a new bandwidth part BWP is performed;
  switching to a new transmission reception point TRP is performed; and
  switching to a new beam is performed.

Optionally, the transmitting module 401 is further configured to transmit, on an uplink grant resource configured or indicated by the network device, BFRQ information to the network device.

Optionally, the BFRQ information is carried by a MAC CE.

Optionally, the transmitting module 401 is further configured to: in a case that the second trigger condition is met, cancel transmission of the BFRQ information.

Optionally, the SR is an SR dedicated to beam failure recovery.

The terminal provided in this embodiment of this disclosure can implement the processes implemented by the terminal in the method embodiment in FIG. 2. To avoid repetition, details are not described herein again.

Figure 5:
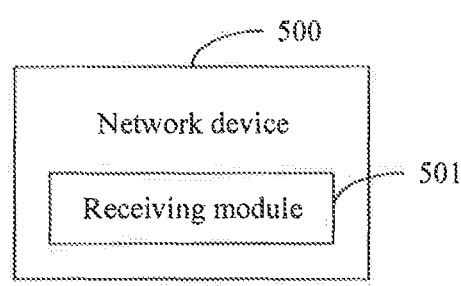
FIG. 5 is a structural diagram of a network device according to an embodiment of this disclosure.

Referring to FIG. 5, FIG. 5 is a structural diagram of a network device according to an embodiment of this disclosure. As shown in FIG. 5, the network device 500 includes:
  a receiving module 501, configured to: receive a scheduling request SR transmitted by a terminal in a case that a first trigger condition is met; and in a case that a second trigger condition is met, stop reception of the SR, or skip reception of the SR for N times, where N is an integer greater than 1.

Optionally, the first trigger condition includes at least one of the following:
  the terminal detects a beam failure;
  the terminal detects a beam failure and identifies a new beam; and
  the terminal has pending beam failure recovery request BFRQ information, but no uplink resource is available for transmitting the pending BFRQ information.

Optionally, that the terminal detects a beam failure includes at least one of the following:
  the terminal detects a beam failure in a cell;
  the terminal detects a beam failure in a bandwidth part BWP; and
  the terminal detects a beam failure at a transmission reception point TRP.

That the terminal detects a beam failure and identifies a new beam includes at least one of the following:
  the terminal detects a beam failure in a cell, and identifies a new beam in the cell in which the beam failure is detected;
  the terminal detects a beam failure in a bandwidth part BWP, and identifies a new beam in the BWP in which the beam failure is detected; and
  the terminal detects a beam failure at a transmission reception point TRP, and identifies a new beam at the TRP at which the beam failure is detected.

Optionally, the second trigger condition includes any one of the following:
  BFRQ information sent by the terminal is received;
  beam failure recovery is completed;
  at least one of radio resource control RRC, a medium access control control element MAC CE, and downlink control information DCI is sent to the terminal;
  a cell in which a beam failure has occurred is released or deactivated; a bandwidth part BWP in which a beam failure has occurred is released or deactivated;
  a transmission reception point TRP in which a beam failure has occurred is released or deactivated;
  switching to a new cell is performed;
  switching to a new bandwidth part BWP is performed;
  switching to a new transmission reception point TRP is performed; and
  switching to a new beam is performed.

Optionally, after the receiving a scheduling request SR transmitted by a terminal in a case that a first trigger condition is met, the method further includes:
  receiving, on an uplink grant resource configured or indicated by the network device, BFRQ information sent by the terminal.

Optionally, the BFRQ information is carried by a MAC CE.

Optionally, in a case that the second trigger condition is met, reception of the BFRQ information is stopped.

Optionally, the SR is an SR dedicated to beam failure recovery.

The network device provided in this embodiment of this disclosure can implement the processes implemented by the network device in the method embodiment in FIG. 3. To avoid repetition, details are not described herein again.

Figure 6:
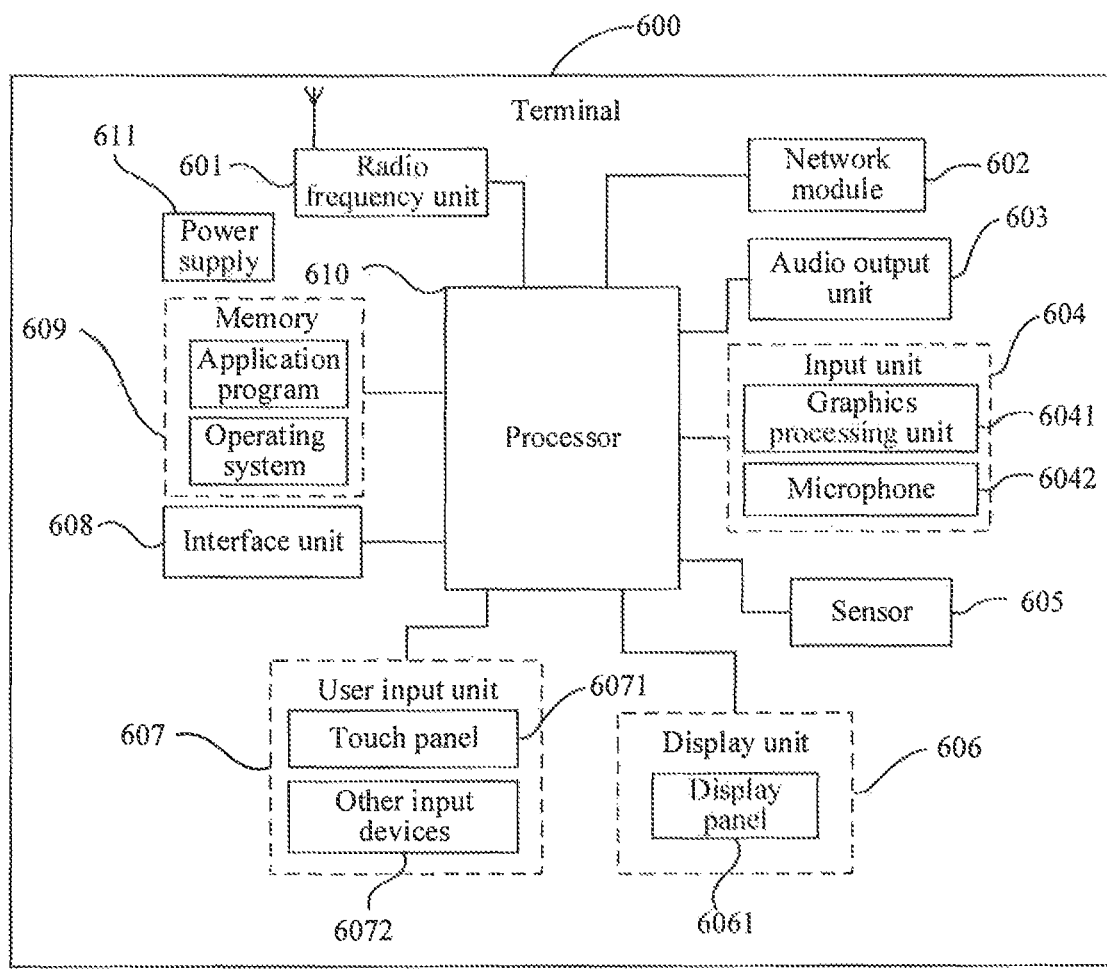
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

a radio frequency unit 601 is configured to: in a case that a first trigger condition is met, transmit a scheduling request SR to a network device; and in a case that a second trigger condition is met, cancel transmission of the SR, or skip transmission of the SR for N times, where N is an integer greater than 1.

In this embodiment of this disclosure, the second trigger condition is set, and in a case that the second trigger condition is met, transmission of the SR is canceled, or transmission of the SR is skipped for N times. This reduces transmissions of the SR, thereby reducing resource overheads for the SR; and also reduces power consumption of the terminal, thereby extending standby time of the terminal.

It should be understood that, in this embodiment of this disclosure, the radio frequency unit 601 may be configured to transmit or receive a signal in an information transmitting/receiving or call process. Specifically, the radio frequency unit 601 receives downlink data from a base station, transmits the downlink data to the processor 610 for processing, and transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides wireless broadband internet access for a user by using the network module 602, for example, helps the user transmit and receive e-mails, browse web pages, and access streaming media.

The audio output unit 603 can convert, into audio signals, the audio data that is received by the radio frequency unit 601 or the network module 602 or stored in the memory 609, and output the audio signals as sounds. In addition, the audio output unit 603 may further provide audio output (for example, a call signal reception tone or a message reception tone) that is related to a specific function performed by the terminal 600. The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 can receive a sound and can process the sound into audio data. The processed audio data can be converted into a format in which the audio data can be sent to a mobile communication base station through the radio frequency unit 601 for output in a telephone call mode.

The terminal 600 further includes at least one sensor 605, for example, an optical sensor, a motion sensor, and other sensors. Specifically, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be configured to receive input digit or character information, and generate key signal input that is related to user setting and function control of the terminal. Specifically, the user input unit 607 includes a touch panel 6071 and other input devices 6072. The touch panel 6071, also referred to as a touchscreen, can collect a touch operation of the user on or near the touch panel (such as an operation performed by the user on the touch panel 6071 or near the touch panel 6071 or by using any proper object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, and a joystick. Details are not described herein.

Further, the touch panel 6071 may cover the display panel 6061. After detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although the touch panel 6071 and the display panel 6061 are used as two separate components to implement input and output functions of the terminal in FIG. 6, the touch panel 6071 and the display panel 6061 may be integrated to implement the input and output functions of the terminal in some embodiments. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 609 may include a high-speed random access memory, or may include a non-volatile memory, for example, at least one magnetic disk storage device, a flash memory device, or other volatile solid-state storage devices.

The processor 610 is a control center of the terminal, and is connected to all components of the terminal by using various interfaces and lines. By running or executing a software program and/or a module stored in the memory 609 and invoking data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor 610, a memory 609, and a computer program stored in the memory 609 and capable of running on the processor 610. When the computer program is executed by the processor 610, the processes of the foregoing scheduling request transmitting method embodiment are implemented, with the same technical effect achieved. To avoid repetition, details are not described herein again.

Figure 7:
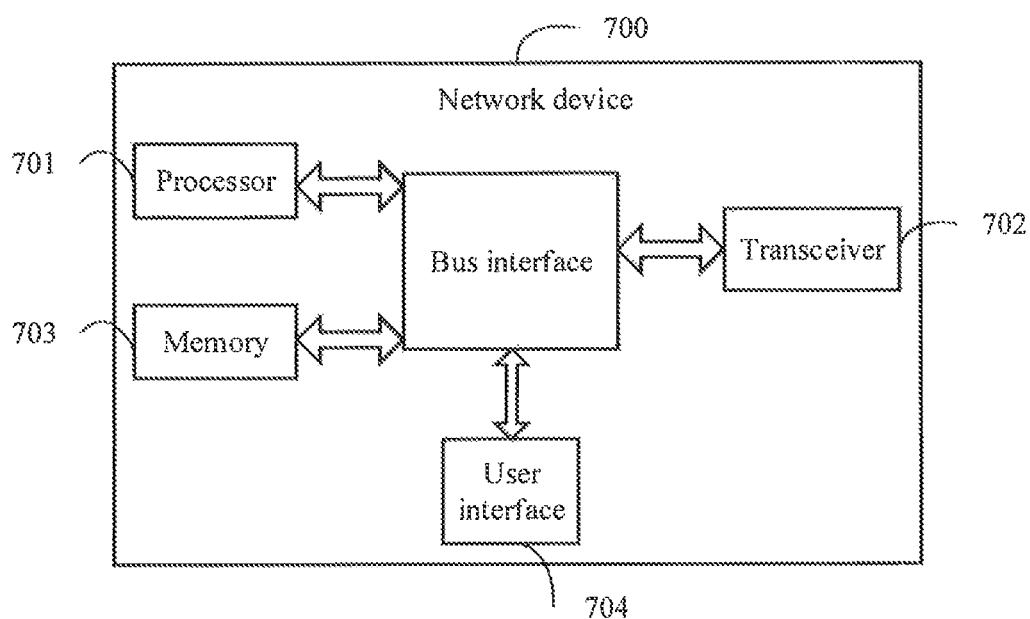
FIG. 7 is a structural diagram of another network device according to an embodiment of this disclosure.

Referring to FIG. 7, FIG. 7 is a structural diagram of another network device according to an embodiment of this disclosure. As shown in FIG. 7, the network device 700 includes a processor 701, a transceiver 702, a memory 703, and a bus interface.

The transceiver 702 is configured to: receive a scheduling request SR transmitted by a terminal in a case that a first trigger condition is met; and in a case that a second trigger condition is met, stop reception of the SR, or skip reception of the SR for N times, where N is an integer greater than 1.

In this embodiment of this disclosure, the second trigger condition is set, and in a case that the second trigger condition is met, transmission of the SR is canceled, or transmission of the SR is skipped for N times. This reduces transmissions of the SR, thereby reducing resource overheads for the SR; and also reduces power consumption of the terminal, thereby extending standby time of the terminal.

In FIG. 7, a bus architecture may include any quantity of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides an interface. The transceiver 702 may be a plurality of components, including a transmitter and a receiver, and provides units for communicating with a variety of other apparatuses on a transmission medium. For different user equipment, the user interface 704 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data for use by the processor 701 when the processor 701 performs an operation.

Optionally, an embodiment of this disclosure further provides a network device, including a processor 701, a memory 703, and a computer program stored in the memory 703 and capable of running on the processor 701. When the computer program is executed by the processor 701, the processes of the foregoing scheduling request receiving method embodiment are implemented, with the same technical effect achieved. To avoid repetition, details are not described herein again.

An embodiment of this disclosure further provides a computer-readable storage medium, where the computer-readable storage medium stores a computer program. When the computer program is executed by a processor, the processes of the scheduling request receiving method on a network device side provided in the embodiments of this disclosure are implemented, or when the computer program is executed by a processor, the processes of the scheduling request transmitting method on a terminal side provided in the embodiments of this disclosure are implemented, with the same technical effect achieved. To avoid repetition, details are not described herein again. For example, the computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions in the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the related art may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. In implementation by hardware, modules, units, and sub-units may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A scheduling request transmitting method, comprising:
   in a case that a first trigger condition is met, transmitting by a terminal a scheduling request (SR) to a network device; and in a case that a second trigger condition is met, canceling by the terminal transmission of the SR, or skipping transmission of the SR for N times, wherein N is an integer greater than 1;

wherein before the transmitting by the terminal the scheduling request (SR) to the network device, the method further comprises:

in a case that a beam failure is detected, triggering by the terminal a first medium access control control element (MAC CE), wherein the first MAC CE is used to transmit BFRQ information; or in a case that a beam failure is detected and a new beam is identified, triggering by the terminal a first MAC CE, wherein the first MAC CE is used to transmit BWRQ information.

2. The method according to claim 1, wherein the first trigger condition comprises at least one of the following:
a beam failure is detected by the terminal;
a beam failure is detected by the terminal and a new beam is identified by the terminal; and
the terminal has pending beam failure recovery request (BFRQ) information, but no uplink resource is available for transmitting the pending BFRQ information.

3. The method according to claim 2, wherein that a beam failure is detected comprises at least one of the following:
a beam failure is detected in a cell;
a beam failure is detected in a bandwidth part (BWP); and
a beam failure is detected at a transmission reception point (TRP).

4. The method according to claim 2, wherein that a beam failure is detected and a new beam is identified comprises at least one of the following:
a beam failure is detected in a cell, and a new beam is identified in the cell in which the beam failure is detected;
a beam failure is detected in a bandwidth part (BWP), and a new beam is identified in the BWP in which the beam failure is detected; and
a beam failure is detected at a transmission reception point (TRP), and a new beam is identified at the TRP at which the beam failure is detected.

5. The method according to claim 1, wherein the first MAC CE is in a pending state.

6. The method according to claim 1, wherein the second trigger condition comprises any one of the following:
BFRQ information is sent to the network device;
beam failure recovery is completed;
at least one of radio resource control (RRC), a medium access control control element (MAC CE), and downlink control information (DCI) is received from the network device;
a cell in which a beam failure has occurred is released or deactivated;
a bandwidth part (BWP) in which a beam failure has occurred is released or deactivated;
a transmission reception point (TRP) in which a beam failure has occurred is released or deactivated;
switching to a new cell is performed;
switching to a new bandwidth part (BWP) is performed;
switching to a new transmission reception point (TRP) is performed; and
switching to a new beam is performed.

7. The method according to claim 1, wherein after the transmitting by the terminal the scheduling request (SR) to the network device, the method further comprises:

transmitting, by the terminal on an uplink grant resource configured or indicated by the network device, beam failure recovery request (BFRQ) information to the network device.

8. The method according to claim 7, wherein the BFRQ information is carried by a MAC CE.

9. The method according to claim 7, wherein in a case that the second trigger condition is met, the method further comprises:
canceling, by the terminal, transmission of the BFRQ information.

10. The method according to claim 1, wherein the SR is an SR dedicated to beam failure recovery.

11. A terminal, comprising a memory, a processor, and a program stored in the memory and capable of running on the processor, wherein when the program is executed by the processor, the following steps are implemented:
in a case that a first trigger condition is met, transmitting a scheduling request (SR) to a network device; and
in a case that a second trigger condition is met, canceling transmission of the SR, or skipping transmission of the SR for N times, wherein N is an integer greater than 1;
wherein before the transmitting the scheduling request (SR) to the network device, the method further comprises:
in a case that a beam failure is detected, triggering a first medium access control control element (MAC CE), wherein the first MAC CE is used to transmit BFRQ information; or
in a case that a beam failure is detected and a new beam is identified, triggering a first MAC CE, wherein the first MAC CE is used to transmit BFRQ information.

12. The terminal according to claim 11, wherein the first trigger condition comprises at least one of the following:
a beam failure is detected by the terminal;
a beam failure is detected by the terminal and a new beam is identified by the terminal; and
the terminal has pending beam failure recovery request (BFRQ) information, but no uplink resource is available for transmitting the pending BFRQ information.

13. The terminal according to claim 12, wherein that a beam failure is detected comprises at least one of the following:
a beam failure is detected in a cell;
a beam failure is detected in a bandwidth part (BWP); and
a beam failure is detected at a transmission reception point (TRP).

14. The terminal according to claim 11, wherein the second trigger condition comprises any one of the following:
BFRQ information is sent to the network device;
beam failure recovery is completed;
at least one of radio resource control (RRC), a medium access control control element (MAC CE), and downlink control information (DCI) is received from the network device;
a cell in which a beam failure has occurred is released or deactivated;
a bandwidth part (BWP) in which a beam failure has occurred is released or deactivated;
a transmission reception point (TRP) in which a beam failure has occurred is released or deactivated;
switching to a new cell is performed;
switching to a new bandwidth part (BWP) is performed;
switching to a new transmission reception point (TRP) is performed; and
switching to a new beam is performed.

15. The terminal according to claim 11, wherein after the transmitting the scheduling request (SR) to the network device, the method further comprises:

transmitting, on an uplink grant resource configured or indicated by the network device, beam failure recovery request (BFRQ) information to the network device.

\* \* \* \* \*